United States Patent [19]
Kuroiwa et al.

[11] Patent Number: 5,428,109
[45] Date of Patent: Jun. 27, 1995

[54] HOT-MELT ADHESIVE COMPOSITION

[75] Inventors: Toshiaki Kuroiwa; Tuneaki Muro; Suguru Tokita; Hajime Inagaki, all of Yamaguchi, Japan

[73] Assignee: Mitsui Petrochemical Industries, Ltd., Tokyo, Japan

[21] Appl. No.: 167,211

[22] Filed: Dec. 16, 1993

[30] Foreign Application Priority Data

Dec. 16, 1992 [JP] Japan .................... 4-335998

[51] Int. Cl.$^6$ ............................. C08L 45/00
[52] U.S. Cl. .................... 525/210; 524/505; 524/518; 524/549; 524/577; 525/97
[58] Field of Search ............ 524/518, 549, 577, 505; 525/97, 210

[56] References Cited

U.S. PATENT DOCUMENTS

| | | | |
|---|---|---|---|
| 3,535,153 | 10/1970 | Korpman | 117/122 |
| 3,632,540 | 1/1972 | Eugene et al. | 260/27 |
| 5,006,582 | 4/1991 | Mancinelli | 524/271 |
| 5,059,487 | 10/1991 | Muro et al. | 428/500 |

FOREIGN PATENT DOCUMENTS 2277135 7/1975 France.

OTHER PUBLICATIONS

AN 86-277853 Patent Abstract, Database WPI, week 8642, Derwent Publications, Ltd., London, GB. Patent Abstract SU-A-1 214, 694 (1986).

*Primary Examiner*—Paul R. Michl
*Assistant Examiner*—U. K. Rajguru
*Attorney, Agent, or Firm*—Sherman and Shalloway

[57] ABSTRACT

A hot-melt adhesive composition containing, (A) per 10 to 80 parts by weight of a base polymer, (B) 10 to 80 parts by weight of a stickiness-imparting agent which is a copolymer of a particular styrene-type monomer and a particular indene-type monomer, the molar ratio of the indene-type monomer to the styrene-type monomer being from 99/1 to 30/70, and the weight average molecular weight of said copolymer being from 300 to 5000. The hot-melt adhesive composition exhibits excellent heat-resistant adhesiveness and heat-resistant creeping property, and has a low-molecular weight and exhibits good hue.

14 Claims, No Drawings

HOT-MELT ADHESIVE COMPOSITION

BACKGROUND OF THE INVENTION (1) Field of the Invention

The present invention relates to a hot-melt adhesive composition and, particularly, to a hot-melt adhesive composition having excellent heat-resistant adhesiveness and heat-resistant creeping property.

(2) Description of the Prior Art

Attempts have been made to use low-molecular polymers and petroleum resins such as styrene, vinyltoluene, α-methylstyrene and the like as stickiness-imparting resins that are to be blended into rubber-type pressure-sensitive adhesive agents and to ethylene/vinyl acetate copolymer-type and styrene block copolymer-type hot-melt adhesive agents. However, when the above resins are used for the rubber-type pressure-sensitive adhesive agents, a sufficiently large adhesive force or sticking force is not obtained. When the above resins are used for the hot-melt adhesives, furthermore, compatibility becomes poor with respect to the ethylene/vinyl acetate copolymer which is a chief component of the adhesive agent. On the other hand, petroleum resins produced from the ordinary fractions of distillates containing unsaturated hydrocarbons involve problems in regard to hue and thermal stability.

In order to solve these problems, the present inventors have previously proposed the use of a polymer which is obtained by polymerizing at a particular ratio the isopropenyltoluene and any fraction of distillate selected from those fractions of distillate having 4 to 5 carbon atoms that are by-produced at the time of refining petroleum or cracking petroleum, as well as the use of a homopolymer of the isopropenyltoluene (Japanese Laid-Open Patent Publications Nos. 118729/1974 and 128945/1974 and Japanese Patent Publication No. 34033/1979).

Though the above-mentioned problems were improved by these proposals, however, lack of heat-resistant adhesiveness and lack of heat-resistant creeping property in the hot-melt adhesive agent have not still been solved. It has further been known that the above-mentioned homopolymer of isopropenyltoluene helps improve the heat resistance when it is used for the hot-melt adhesive agent of the styrene block copolymer type, but makes it difficult to obtain high softening-point products having softening points of higher than 120° C. maintaining good yields. Furthermore, a resin that has been placed in the market as a resin to impart heat resistance, has a high molecular weight and helps improve heat-resistant creeping property. This resin, however, exhibits poor compatibility with respect to the base resin that is a chief component of the adhesive agent, and gives such defects as decreased tacking property of the adhesive agent and increased melt viscosity of the hot-melt adhesive agent making the operation of application difficult.

As a stickiness-imparting agent for improving the hue and the heat resistance, furthermore, there has been proposed a nuclear-hydrogenated copolymer resin of a cyclopentadiene, a dicyclopentadiene or an alkyl-substituted product thereof and an indene or an alkyl-substituted product thereof (Japanese Patent Publication No. 8849/1986). After the polymerization, however, a step is necessary for effecting the hydrogenation, causing the process to become complex and the cost to become high.

SUMMARY OF THE INVENTION

The object of the present invention therefore is to provide a hot-melt adhesive composition having excellent heat-resistant adhesiveness and heat-resistant creeping property by blending a stickiness-imparting resin that has a low molecular weight, excellent hue and excellent heat resistance.

In order to solve the above-mentioned problems, the present invention provides a hot-melt adhesive composition which contains, (A) 10 to 80 parts by weight of a base polymer, (B) 10 to 80 parts by weight of a stickiness-imparting agent which is a copolymer of a styrene-type monomer represented by the general formula (I):

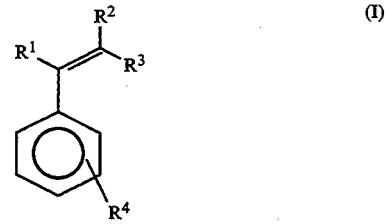

wherein $R^1$, $R^2$, $R^3$ and $R^4$ are hydrogen atoms or alkyl groups with 4 or less carbon atoms, which may be the same or different, and an indene-type monomer represented by the general formula (II)

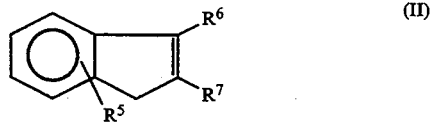

wherein $R^5$, $R^6$ and $R^7$ are hydrogen atoms or alkyl groups with 6 or less carbon atoms, which may be the same or different, the molar ratio of the monomers (I)/(II) being from 99/1 to 30/70, and the weight average molecular weight of the copolymer being from 300 to 5000.

The hot-melt adhesive composition of the present invention (hereinafter referred to as "composition of the present invention") will be described below in detail.

DETAILED DESCRIPTION OF THE PREFERRED EMBODIMENTS

The base polymer (A) used for the composition of the present invention may be a polymer that is usually used for the hot-melt adhesive agent without any limitation. In the following are mentioned the examples.

1) Polyolefin polymer; e.g., a polyolefin homopolymer or a polyolefin copolymer such as a polyethylene, an atactic polypropylene, an isotactic or a syndiotactic polypropylene, an ethylene/propylene copolymer or an ethylene/propylene/diene copolymer.

2) Olefin/vinyl acetate type copolymer or saponified olefin/vinyl acetate copolymer; e.g., a copolymer of olefin and vinyl acetate or a saponified copolymer thereof such as an ethylene/vinyl acetate copolymer (EVA), an ethylene/vinyl acetate saponified copolymer (saponified EVA), a graft-modified ethylene/vinyl acetate copolymer and the like.

3) Olefin/(meth)acrylic acid copolymer or olefin/(meth)acrylic acid derivative copolymer; e.g., an ethylene/(meth)acrylate copolymer such as an ethylene/(meth)ethyl acrylate (EEA) and the like, or an ethylene/(meth)acrylic acid copolymer, an ionomer resin obtained by partly neutralizing the ethylene/(meth)acrylic acid copolymer (concrete example: "Himilan", tradename manufactured by Mitsui-Dupont Chemical Co.), an ethylene/propylene/(meth)acrylate terpolymer, and the like.

4) Vinyl acetate type:copolymer other than the above; e.g., a vinyl acetate/chronic acid copolymer, a vinyl acetate/phthalic anhydride copolymer, a vinyl acetate/vinyl pyrrolidone copolymer, and the like.

5) Polyamide; a reaction product of dibasic acid and diamine, a reaction product of dimeric acid which is a dimer of fatty acid such as soybean oil, tung oil or tall oil and alkyldiamine such as ethylenediamine or diethylenetriamine, and nylons such as nylon 12 or the like. Concrete examples include Diamide (Dycel Kagaku Kogyo Co.), Platilon (Toa Gosei Kagaku Kogyo Co.), Amilan (Toray Co.) and the like which are the tradenames placed in the market.

6) Polyesters; e.g., Ester-Resins 200 and 300 (Toyobo Co.), Vital 200 and 300 (Goodyear Co.) and the like which are the tradenames placed in the market.

7) Copolymer comprising a vinyl aromatic compound and a conjugated diene compound, and hydrogenated product thereof; e.g., a styrene/butadiene random copolymer, a styrene/isoprene random copolymer, a butadiene/polystyrene block copolymer, a polystyrene/polyisoprene block copolymer, a polystyrene/polyisoprene/polystyrene triblock copolymer, a polystyrene/polybutadiene/polystyrene triblock copolymer, a poly( -methylstyrene)/polybutadiene/poly( -methylstyrene) triblock copolymer and hydrogenated products thereof.

These polymers are available in the market and the hydrogenated products thereof are also available in the market. Examples include Kaliflex TR-1101, TR-1107, TR-4113 (Shell Kagaku Co.), Crayton G-6500, G-6521, G-1650, G-1652, G-1657 (Shell Kagaku Co.), Solbrene, hydrogenated Solbrene (Phillips Co.) and the like which are tradenames placed in the market.

8) Other polymers: e.g., a cellulose derivative-type polymer, a polymethyl methacrylate-type polymer, a polyvinyl ether-type polymer, a polyurethane-type polymer, a thermosetting resin-type polymer, and the like.

In the composition of the present invention, the base polymers (A) may be used in one kind alone or in a combination of two or more kinds.

Among these base polymers (A), it is desired to use a copolymer comprising a vinyl aromatic compound and a conjugated diene compound or a hydrogenated product alone or together with other base polymers, since it makes it possible to obtain a large cohesive force and to markedly improve heat-resistant adhesiveness and heat-resistant creeping property owing to the mutual action between the styrene blocks possessed by the base polymer (A) and the styrene blocks possessed by the stickiness-imparting resin (B).

The stickiness-imparting resin (B) used for the composition of the present invention is obtained by the copolymerization of a styrene-type monomer represented by the aforementioned general formula (I) and an indene-type monomer represented by the general formula (II). The stickiness-imparting resin (B) may be any one of the bicopolymer, tercopolymer or tetracopolymer based upon the combination of the styrene-type monomer represented by the above general formula (I) and the indene-type monomer represented by the general formula (II).

In the general formula (I) representing the styrene-type monomer, $R^1$, $R^2$, $R^3$ and $R^4$ are hydrogen atoms or alkyl groups with 4 or less carbon atoms, which may be the same or different. Examples of the alkyl group with 4 or less carbon atoms include a methyl group, an ethyl group, a propyl group, a butyl group or the like.

Concrete examples of the styrene-type monomer represented by the general formula (I) include a styrene, a vinyltoluene, an α-methylstyrene, an isopropenylbenzene, an isopropenyltoluene, an ethylvinylbenzene, a propylvinylbenzene, a vinylcumene and the like.

In the present invention, the styrene-type monomers represented by the general formula (I) may be used in a single kind alone or in a combination of two or more kinds.

Among these styrene-type monomers, it is desired to use a styrene, a vinyltoluene, an α-methylstyrene and an isopropenyltoluene from the standpoint of availability and cost.

In the above-mentioned general formula (II) representing the indene-type monomer, RS, R6 and R7 are hydrogen atoms or alkyl groups with 6 or less carbon atoms, which may be the same or different. Examples of the alkyl group with 6 or less carbon atoms include a methyl group, an ethyl group, a propyl group, a butyl group, a pentyl group, a hexyl group and the like.

Concrete examples of the indene-type monomer include an indene, a methylindene, an ethylindene and the like.

In the present invention, the indene-type monomers represented by the above-mentioned formula (II) may be used in one kind alone or in a combination of two or more kinds.

Among the indene-type monomers, an indene is preferred from the standpoint of availability and cost.

The molar ratio of styrene-type monomer represented by the general formula (I)/monomer represented by the general formula (II) is from 99/1 to 30/77 and, preferably, from 95/5 to 45/55 from the standpoint of good compatibility to the base polymer (A) and of obtaining adhesive composition having softness. The ratio of monomers in the stickiness-imparting resin (B) can be found by measuring the monomers remaining in the solution after the reaction based upon gas chromatography.

In order to further improve compatibility with the base polymer (A), the stickiness-imparting resin may contain, as a copolymer component, any fraction of distillate selected from those fractions of distillate having 4 to 5 carbon atoms by-produced during the refining of petroleum or cracking of petroleum. Among the fractions of distillate having 4 to 5 carbon atoms, the C4-fraction contains butane, butene-1, butene-2, isobutene, butadiene and the like, and the C5-fraction contains pentane, pentene, methylbutene, piperylene, isoprene, cyclopentene, cyclopentadiene and the like.

When the stickiness-imparting resin contains the fractions having 4 to 5 carbon atoms as copolymerizable components, it :is desired that the ratio of the fractions having 4 to 5 carbon atoms in the stickiness-imparting resin is smaller than 20 mol % from the standpoint of maintaining good hue of the stickiness-imparting resin.

The stickiness-imparting resin can be prepared by subjecting the ;styrene-type monomer, indene-type monomer and, as required, fractions with 4 to 5 carbon atoms to the colpolymerization reaction in the presence of a catalyst.

The catalyst used for the polymerization is the one that is generally known as Friedel-Crafts catalyst. Examples include various complexes such as an aluminum chloride, an aluminum bromide, a dichloromonoethyl aluminum, a titanium tetrachloride; a tin tetrachloride, and a boron trifluoride.

It is desired that the catalyst is used in an amount of from 0.01 to 5.0% by weight and, preferably, from 0.05 to 3.0% by weight with respect to the total weight of the styrene-type monomer and the indene-type monomer.

In order to remove the heat of reaction and to suppress the reaction mixture from becoming highly sticky, furthermore, it is desired to carry out the polymerization reaction in at least one kind of hydrocarbon solvent selected from aromatic hydrocarbons, aliphatic hydrocarbons and alicyclic hydrocarbons. Preferred examples of the hydrocarbon solvent include aromatic hydrocarbons such as a toluene, a xylene, an ethylbenzene, a mesitylene, a cumene, a cymene or a mixture thereof, or a mixture thereof with aliphatic hydrocarbons such as a pentane, a hexane, a heptane, an octane and the like and/or alicyclic hydrocarbons such as a cyclopentane, a cyclohexane, a methylcyclohexane and the like. During the polymerization, it is desired to adjust the amount of the hydrocarbon solvent so that the initial concentration of monomers in the reaction mixture ranges from 10 to 70% by weight.

The polymerization temperature varies depending upon the kinds and amounts of the monomers and the catalyst that are used but should usually range from $-30°$ to $50°$ C.

The polymerization time is usually from about 0.5 to about 5 hours. Generally, the polymerization is almost all finished in one to two hours.

The mode of polymerization may be either the batch-wise type or the continuous type. It is further allowable to carry out the multi-stage polymerization.

The stickiness-imparting agent (B) of the present invention should have a weight average molecular weight of from 300 to 5000 and, preferably, from 500 to 3000 from the standpoint of obtaining stickiness-retaining property and stickiness, as well as good compatibility to the base polymer (A), good adhesiveness, adhesion-retaining property and tacking property which are well balanced.

According to the present invention, furthermore, the stickiness-imparting resin (B) should have a softening point of from 60° to 180° C. from the standpoint of markedly improving the heat resistance of the adhesive agent and facilitating the production.

The ratio of blending the base polymer (A) and the stickiness-imparting resin (B) in the composition of the present invention is such that the amount of the stickiness-imparting resin (B) is from 10 to 80 parts by weight while the amount of the base polymer (A) is from 10 to 80 parts by weight and, preferably, that the amount of the stickiness-imparting resin (B) is from 20 to 70 parts by weight while the amount of the base polymer (A) is from 20 to 70 parts by weight.

As required, furthermore, the composition of the present invention can be blended with a variety of additives in addition to the base polymer (A) and the stickiness-imparting resin (B). In order to decrease the melt viscosity of the composition of the present invention to improve operability, for instance, the composition of the present invention may be blended with waxes. Examples of the wax that can be used include natural products such as a paraffin wax, a microcrystalline wax and the like; synthetic products such as a petroleum-type wax, SASOL wax and the like; synthetic products such as a coal-type wax, a polyethylene wax, a polypropylene wax and the like; and a petroleum-type polyolefin wax and the like. As required, furthermore, the synthetic petroleum-type polyoleffin wax can be used being modified.

The composition of the present invention may further be blended with an aliphatic hydrogenated tackifier, a rosin, a modified rosin or an esterified product thereof, an aliphatic petroleum resin, an alicyclic petroleum resin, an aromatic petroleum resin, a copolymerized petroleum resin of an aliphatic component and an aromatic component, a low-molecular styrene-type resin, an isoprene-type resin, an alkylphenol resin, a terpene resin, a cumarone, an indene resin and the like.

As required, furthermore, the composition of the present invention can be blended with a variety of blending agents such as a softening agent, a stabilizer, a filler, an antioxidizing agent and the like within a range that does not impair the object of the present invention.

The composition of the present invention is prepared by feeding the base polymer (A), the stickiness-imparting resin (B) and, as required, the aforementioned components at a predetermined blending ratio to a mixing machine such as the Brabender, melting and mixing them together while being heated, and molding the mixture into a desired shape such as granules, flakes, rods or the like.

The composition of the present invention is melted by heating and is applied onto a material such as cloth, craft paper, aluminum foil, polyester film or the like to form the layer of an adhesive agent which is then put into use.

The composition of the present invention can further be used as a hot-melt adhesive agent and as a pressure-sensitive adhesive agent, a printing ink, a resin for paint and the like.

EXAMPLES

Examples of the invention are described below to more concretely illustrate the invention which, however, is in no way limited thereto only. Synthesis of stickiness-imparting resin.

Reference Examples 1 to 6

In all of these Examples, an autoclave equipped with stirrer vanes and having a real content of 1270 ml was continuously served with an isopropenyltoluene, an indene, a dehydrated and refined toluene and a boron trifluoride phenolate complex (phenol, 1.6 times equivalent) diluted 10-fold with the dehydrated and refined toluene at ratios as shown in Table 1, so that the total amount of the isopropenyltoluene and the indene was 1.0 l/hr, and t-he polymerization reaction was carried out at a reaction temperature of 5° C. The reaction mixture was then shifted to an autoclave of the second stage to continue the polymerization reaction at 5° C. When the total residence time in the autoclaves of the first and second stages has reached two hours, the reaction mixture was continuously discharged, and the polymerization reaction was finished when three times of the residence time has passed. After the polymerization, a 1N NaOH aqueous solution was added to the reaction mixture to stop the polymerization reaction. The obtained reaction mixture was washed 5 times with large amounts of water. Then, the solvent and the unreacted monomer were distilled off in an evaporator under a reduced pressure to obtain an isopropenyltoluene/indene copolymer. The polymerization conditions (monomer feeding ratio, amount of catalyst, resin composition, yield) were as shown in Table 1. Properties (hue, softening point, molecular weight Mw, Tg, melt viscosity) of the obtained isopropenyltoluene/-indene copolymer resin were measured in compliance with the methods described below. The results were as shown in Table 2.

Hue: The Gardner number was measured in compliance with JIS K 5400.

Softening point: Measured based on the ring and ball method in compliance with JIS K 2207.

Weight average molecular weight: Measured by using a gel permeation chromatography under the following conditions.
Solvent: THF
Temperature: 40° C.
Column: manufactured by Toso Co.,
TSK gel G7000HXL,
TSK gel G4000HXL, two columns,
TSK gel G2000HXL,
TSK guard column HXL.

Tg: Measured by using DSC in compliance with ASTM D9418-75.

Melt viscosity: Measured by using an EMILA viscometer.

Reference Example 7

An autoclave equipped with stirrer vanes and having a real content of 1270 ml was continuously served with an isopropenyltoluene, a dehydrated and refined toluene and a boron trifluoride phenolate complex (phenol 16 times equivalent) diluted 10 fold with the dehydrated and refined toluene at ratios as shown in Table 1, so that the amount of the isopropenyltoluene that was fed was 1.0 l/hr, and the polymerization reaction was carried out at a reaction temperature of 5° C. The reaction mixture was then shifted to an autoclave of the second stage to continue the polymerization reaction at 5° C. When the total residence time in the autoclaves of the first and second stages reached two hours, the reaction mixture was continuously discharged, and the polymerization reaction was finished when three times of the residence time has passed. After the polymerization, a 1N NaOH aqueous solution was added to the reaction mixture to stop the polymerization reaction. The obtained reaction mixture: was washed 5 times with large amounts of water. Then, the solvent and the unreacted monomer were distilled off in an evaporator under a reduced pressure to obtain an isopropenyltoluene homopolymer. The polymerization conditions (monomer feeding ratio, amount of catalyst, resin composition, yield) were as shown in Table 1. Properties (hue, softening point, molecular weight Mw, Tg) of the obtained isopropenyltoluene homopolymer resin were measured. The results were as shown in Table 2.

Reference Example 8

An autoclave equipped with stirrer vanes and having a real content of 1270 ml was continuously served with an isopropenyltoluene, an indene, a dehydrated and refined toluene and a boron trifluoride phenolate complex (phenol, 1.6 times equivalent) diluted 10-fold with the dehydrated and refined toluene at ratios as shown in Table 1, so that the total amount of the isopropenyltoluene and the indene was 1.0 l/hr, and the polymerization reaction was carried out at a reaction temperature of 0° C. The reaction mixture was then shifted to an autoclave of the second stage to continue the polymerization reaction at 0° C. when the total residence time in the autoclaves of the first and second stages reached two hours, the reaction mixture was continuously discharged, and the polymerization reaction was finished when three times of the residence time had passed. After the polymerization, a 1N NaOH aqueous solution was added to the reaction mixture to stop the polymerization reaction. The obtained reaction mixture was washed 5 times with large amounts of water. Then, the solvent and the unreacted monomer were distilled off in an evaporator under a reduced pressure to obtain an isopropenyltoluene/indene copolymer. The polymerization conditions (monomer feeding ratio, amount of catalyst, resin composition, yield) were as shown in Table 1. Properties (hue, softening point, molecular weight Mw, Tg) of the obtained isopropenyltoluene/indene copolymer resin were measured. The results were as shown in Table 2.

TABLE 1

| | Amount of monomer fed (g) | | | Catalyst concentration | Resin composition | |
| | Isopropenyl-toluene (IPT) | Indene (ID) | Toluene | % by weight relative to monomer | (IPT/ID) (mol %) | Yield (%) |
| --- | --- | --- | --- | --- | --- | --- |
| Reference Example 1 | 80 | 20 | 100 | 0.25 | 82/18 | 78.8 |
| Reference Example 2 | 75 | 25 | 100 | 0.25 | 78/22 | 65.6 |
| Reference Example 3 | 75 | 25 | 100 | 0.15 | 84/16 | 36.0 |
| Reference Example 4 | 60 | 40 | 100 | 0.25 | 63/37 | 71.0 |
| Reference Example 5 | 55 | 45 | 100 | 0.30 | 53/47 | 79.2 |
| Reference Example 6 | 50 | 50 | 100 | 0.20 | 57/43 | 56.6 |
| Reference Example 7 | 100 | 0 | 100 | 0.12 | 100/0 | 23.5 |
| Reference Example 8 | 80 | 20 | 50 | 0.07 | 91/9 | 13.5 |

TABLE 2

| | Softening point (°C.) | Hue (*) | Tg (°C.) | Molecular weight | | |
|---|---|---|---|---|---|---|
| | | | | Mn | Mw | Mw/Mn |
| Reference Example 1 | 91.7 | <1 | | 684 | 980 | 1.43 |
| Reference Example 2 | 99.7 | <1 | | 710 | 1135 | 1.59 |
| Reference Example 3 | 118.3 | <1 | | 995 | 1610 | 1.62 |
| Reference Example 4 | 131.3 | <1 | 64.3 | 974 | 1574 | 1.62 |
| Reference Example 5 | 134.4 | <1 | | 865 | 1542 | 1.78 |
| Reference Example 6 | 151.6 | <1 | 78.3 | 1300 | 2105 | 1.63 |
| Reference Example 7 | 119.8 | <1 | 55.8 | 967 | 1491 | 1.54 |
| Reference Example 8 | 155.0 | <1 | 93.0 | 2610 | 6470 | 2.47 |

*;Gardener No.

Examples 1 to 7

In these Examples, a hydrogenated product of a styrene-butadiene-styrene triblock copolymer (Krayton G-1657, produced by Shell Co.) as a base polymer and the isopropenyltoluene/indene copolymers obtained in Reference Examples 1 to 6 as stickiness-imparting resins were blended at ratios shown in Table 3, and were kneaded in a LABO PLASTOMILL at 180° C. for 15 minutes to obtain a hot-melt adhesive composition.

The obtained hot-melt adhesive composition was applied onto an aluminum foil (50 μm) into a thickness of 25 μm. The thus applied surfaces were then stuck to each other and were heat-sealed under the heating conditions of an upper bar at 120° C., a lower bar at 120° C., 3 kg/cm² for 10 seconds. The aluminum foil was then cut into 25 mm in width to prepare adhesion samples. The adhesion samples were put to the T-type peeling test at a measuring temperature of 0° C. to 80° C. to measure the adhesion strength (tension speed: 300 mm/min).

A load of 500 g was applied to the adhesion samples, and a temperature at which the load fall was measured in an atmosphere in which the temperature was raised at a rate of 25° C./hr in order to measure the heat-resistant creeping property.

The blending ratios off the base polymer and the stickiness-imparting resin, and the melt viscosities of the adhesive agents were as shown in Table 3, and the adhesion strengths and the heat-resistant creeping properties as measured were as shown in Table 4.

Comparative Example 1

Compositions were prepared in the same manner as in Examples 1 to 7 with the exception of using Alcon P-100 (produced by Arakawa Kagaku Kogyo Co.) which is a product placed in the market instead of using the stickiness-imparting resins prepared in Reference Examples 1 to 6, and the adhesion samples were prepared in order to carry out the adhesion tests and to measure the heat-resistant creeping properties. The blending ratios of the used base polymers and the stickiness-imparting resins, and the melt viscosities of the adhesive agents were as shown in Table 3, and the adhesion strengths and the heat-resistant creeping properties as measured were as shown in Table 4.

Comparative Examples 2, 3

In these examples, the compositions were prepared in the same manner as in Examples 1 to 7 with the exception of using the stickiness-imparting resins of Reference Example 7 or 8 instead of the stickiness-imparting resin prepared in Reference Examples 1 to 6, and the adhesion samples were prepared in order to carry out the adhesion tests and to measure the heat-resistant creeping properties. The blending ratios of the used base polymers and the stickiness-imparting resins, and the melt viscosities of the adhesive agents were as shown in Table 3, and the adhesion strengths and the heat-resistant creeping properties as measured were as shown in Table 4.

TABLE 3

| | Blending ratio (by weight) | Compatibility | Melt viscosity (cps) | |
|---|---|---|---|---|
| | | | 180° C. | 200° C. |
| Example 1 | G-1657/Ref. Exam. 2 = 1/2 | ○ | 63000 | 45000 |
| Example 2 | G-1657/Ref. Exam. 4 = 1/2 | Δ | 335000 | 160000 |
| Example 3 | G-1657/Ref. Exam. 6 = 1/2 | Δ | 10⁶< | 410000 |
| Example 4 | G-1657/Ref. Exam. 4/ Alcon P-100 = 1/1/1 | ○ | 183000 | 55000 |
| Example 5 | G-1657/Ref. Exam. 6/ Alcon P-100 = 1/1/1 | Δ | 335000 | 84000 |
| Example 6 | G-1657/Ref. Exam. 4/ Alcon P-100 = 1/0.4/1.6 | ○ | 57500 | 28300 |
| Example 7 | G-1657/Ref. Exam. 6/ Alcon P-100 = 1/0.4/1.6 | ○ | 70500 | 33000 |
| Comp. Exam. 1 | G-1657/Alcon P-100 = 1/2 | ○ | 48000 | 25000 |
| Comp. Exam. 2 | G-1657/Ref. Exam. 7 = 1/2 | Δ | 115000 | 45000 |
| Comp. Exam. 3 | G-1657/Ref. Exam. 8 = 1/2 | X | 10⁶< | 800000 |

Ref. Exam.: the sample of Reference Example
Comp. Exam.: the sample of Comparative Example
Note: Alcon P-100 is a hydrogenated petroleum resin which comprises a fraction with 9 carbon atoms of distillate as a chief component (produced by Arakawa Kagaku Kogyo Co., commercially available).
○: good, Δ: fair, X: bad

TABLE 4

| | Adhesion strength (g/25 mm) | | | | | Heat-resistant creeping property (°C.) |
|---|---|---|---|---|---|---|
| | 0° C. | 20° C. | 40° C. | 60° C. | 80° C. | |
| Exam. 1 | 500 | 550 | 500 | 400 | 50 | 115.0 |
| Exam. 2 | 480 | 530 | 680 | 470 | 60 | 122.1 |
| Exam. 3 | 520 | 630 | 550 | 440 | 50 | 136.5 |
| Exam. 4 | 730 | 1500 | 2120 | 1320 | 440 | 114.9 |
| Exam. 5 | 1090 | 1660 | 1940 | 2300 | 880 | 127.4 |
| Exam. 6 | 910 | 1660 | 2690 | 2390 | 1890 | 98.3 |
| Exam. 7 | 720 | 1750 | 6000 | 6350 | 240 | 104.3 |
| Comp. Ex. 1 | 200 | 280 | 1380 | 1350 | 720 | 82.0 |
| Comp. Ex. 2 | 490 | 730 | 690 | 160 | 60 | 116.2 |
| Comp. Ex. 3 | 390 | 370 | 270 | 40 | 10 | 128.0 |

We claim:
1. A hot-melt adhesive composition comprising (A) 10 to 80 parts by weight of a base polymer which is a copolymer of a vinyl aromatic compound and a conjugated diene compound, or a hydrogenated product thereof, and (B) 10 to 90 parts by weight of a stickiness-imparting agent which is a copolymer of a styrene monomer represented by the formula (I):

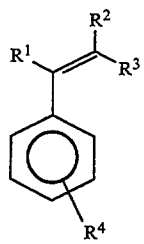

wherein $R^1$, $R^2$, $R^3$ and $R^4$ are each, independently, hydrogen atoms or alkyl groups having 4 or less carbon atoms, which may be the same or different, and an indene monomer represented by the formula (II)

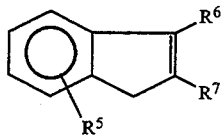

wherein $R^5$, $R^6$ and $R^7$ are each, independently, hydrogen atoms or alkyl groups having 6 or less carbon atoms, which may be the same or different, the molar ratio of the monomers (I)/(II) being from 99/1 to 30/70, and the weight average molecular weight of copolymer (B) being from 300 to 5000.

2. A hot-melt adhesive composition according to claim 1, wherein said base polymer (A) is at least one kind of polymer selected from the polymers consisting of a polybutadiene/polystyrene block copolymer, a polystyrene/polyisoprene block copolymer, a polystyrene/polyisoprene/polystyrene triblock copolymer, a polystyrene/polybutadiene/polystyrene triblock copolymer, a poly($\alpha$-methylstyrene)/polybutadiene/poly($\alpha$-methylstyrene) triblock copolymer, and hydrogenated products of these polymers.

3. A hot-melt adhesive composition according to claim 2, wherein said base polymer (A) is a hydrogenated product of the polystyrene/polybutadiene/polystyrene triblock copolymer.

4. A hot-melt adhesive composition according to claim 1, wherein the styrene monomer component represented by the general formula (I) of the copolymer constituting the stickiness-imparting resin (B) is at least one kind of monomer selected from a styrene, a vinyltoluene, an $\alpha$-methylstyrene and an isopropenyltoluene.

5. A hot-melt adhesive composition according to claim 4, wherein the styrene monomer is an isopropenyltoluene.

6. A hot-melt adhesive composition according to claim 1, wherein the indene monomer component represented by the general formula (II) of the copolymer constituting the stickiness-imparting resin (B) is at least one kind of monomer selected from an indene, a methylindene and an ethylindene.

7. A hot-melt adhesive composition according to claim 6, wherein said indene monomer is an indene.

8. A hot-melt adhesive composition according to claim 1, wherein said stickiness-imparting resin (B) is an isopropenyltoluene/indene copolymer.

9. A hot-melt adhesive composition according to claim 1, wherein said stickiness-imparting resin (B) is obtained by copolymerizing, as a copolymerizable component, a fraction of distillate which comprises unsaturated hydrocarbons having 4 to 5 carbon atoms as chief components.

10. A hot-melt adhesive composition according to claim 9, wherein the amount of the fraction of distillate in the copolymer of the stickiness-imparting resin (B) is less than 20 mol %.

11. The hot-melt adhesive composition according to claim 1 wherein the weight average molecular weight of the copolymer is in the range of from 500 to 3000.

12. The hot-melt adhesive composition according to claim 1 wherein the stickiness-imparting resin (B) has a softening point in the range of from 60° to 180° C.

13. The hot-melt adhesive composition according to claim 1 wherein the molar ratio of the monomers (I)/(II) is 95/5 to 45/55.

14. The hot-melt adhesive composition according to claim 1, wherein the composition comprises 20 to 70 parts by weight of base polymer (A) and 20 to 70 parts by weight of stickiness-imparting agent (B).

* * * * *